United States Patent [19]
Diamond et al.

[11] 3,742,064
[45] June 26, 1973

[54] PHOSPHONIUM COMPOUNDS

[75] Inventors: Julius Diamond, Lafayette Hill; King Auyang, Philadelphia, both of Pa.

[73] Assignee: William H. Rorer, Inc., Fort Washington, Pa.

[22] Filed: Dec. 17, 1970

[21] Appl. No.: 99,313

[52] U.S. Cl. ... 260/606.5 F, 260/465 H, 260/465 G, 260/465 F, 260/465 D, 260/578, 260/577, 260/558, 260/562, 260/471, 260/469, 260/599, 260/601, 260/544, 260/503, 260/556, 260/551, 260/535, 260/537, 260/513, 260/515, 424/221
[51] Int. Cl. ............................................... C07f 9/54
[58] Field of Search .............. 260/606.5 F, 606.5 P

[56] References Cited
UNITED STATES PATENTS

| 3,268,323 | 8/1966 | Goyette | 260/606.5 F |
| 3,502,725 | 3/1970 | Dewhirst et al. | 260/606.5 P |

*Primary Examiner*—Werten F. W. Bellamy
*Attorney*—James A. Nicholson

[57] ABSTRACT

Novel aralkyl phosphonium salts have been prepared. Compounds of this invention possess useful gastric anti-secretory, spasmolytic and anti-ulcerogenic properties. A method of treating gastrointestinal hyperacidity and ulceration has also been disclosed.

33 Claims, No Drawings

PHOSPHONIUM COMPOUNDS

SUMMARY OF THE INVENTION

This invention describes new phosphonium salts and processes for their preparation. This invention further provides valuable pharmaceutical preparations which contain these phosphonium salts as gastric anti-secretory, spasmolytic, and anti-ulcerogenic agents. A method for the treatment of gastrointestinal hyperacidity and ulceration is also described.

BACKGROUND OF THE INVENTION

The pharmaceutical compositions which have been used as anti-secretory and spasmolytic agents have been such as atropine, homatropine, propantheline bromide, dicyclomine hydrochloride and other compounds which are structurally dissimilar to the onium salts of this invention. Due to the anti-cholinergic properties of these known compounds, they produce undesirable side effects such as mydriasis, xerostomia, cyclopegia, and other unwanted effects.

There have been a number of aralkyl and alkyl phosphonium salts described in the literature with a lower alkyl group having up to four carbon atoms. They have mainly been proposed for use as bactericidal and fungicidal agents, and as plant growth regulators.

We have unexpectedly found novel phosphonium salts which have valuable pharmacologic properties.

We have found phosphonium salts which possess useful gastric anti-secretory, spasmolytic, and anti-ulcerogenic properties.

We have further found trialkyl aralkyl phosphonium salts which are novel.

We have also found that the compounds of this invention are substantially void of the anti-cholinergic side effects which accompany heretofor known gastric anti-secretory and spasmolytic agents.

We have still further found a simple and effective method for treating gastric hyperacidity and gastrointestinal ulceration such as duodenal and peptic ulcers.

We have found a class of therapeutically effective compounds which can also be conveniently synthesized.

DESCRIPTION AND PREFERRED EMBODIMENTS

This invention provides a method of preparing novel phosphonium salts.

This invention further provides pharmocologically active chemical compounds which are useful in treating gastrointestinal hyperacidity and ulceration.

The compounds of this invention may be described by the general formula I:

$$\text{Aralk-P}^+\text{-R}_3\text{X}^-  \qquad \text{I}$$

where:
Aralk is an arloweralkyl or substituted arloweralkyl group;
R is a saturated or unsaturated acyclic member having from five to 12 carbon atoms, or a saturated or partially saturated carbocyclic member having from five to 12 carbon atoms; and
X⁻ is a non-toxic inorganic or organic anion.

More specifically, the compounds of this invention may be described by structural formula II:

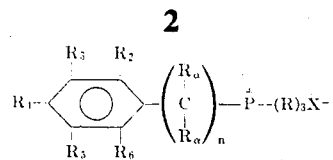

where:
$n$ is 1–2;
$R_\alpha$ is hydrogen, loweralkyl, loweralkenyl, cycloloweralkyl, cycloloweralkenyl, aryl (preferably phenyl, tolyl, xylyl, etc.) or arloweralkyl (preferably benzyl, etc.);
$R_2$, $R_3$, $R_4$, $R_5$ and $R_6$ may be the same or different and are
hydrogen, loweralkyl, halo, haloloweralkyl, nitro, amino, mono- and diloweralkylamino, acylamino, cyano, carbamyl, carboxy, carbloweralkoxy, loweralkoxy, haloloweralkoxy, hydroxy, acyl, haloacyl, acyloxy, phenoxy, halophenoxy, phenyl, halophenyl, thiocyanato, mercapto, loweralkylthio, loweralkylsulfinyl, loweralkylsulfonyl, haloloweralkylsulfonyl, sulfo, sulfonamido, sulfinamido, diloweralkylsulfonamido or halodiloweralkylsulfonamido;
R is a five to 12 carbon atom member which may be straight chained or branched and is
alkyl, alkenyl, cycloalkenyl, cycloalkyl, cycloalkylloweralkyl, spiroalkyl, bicycloalkyl; and
X⁻ is a pharmaceutically acceptable non-toxic organic or inorganic anion
(preferably chloride, bromide, iodide, sulfate, hydrogen sulfate, nitrate, phosphate, dihydrogenphosphate, monohydrogenphosphate, acetate, maleate, citrate, benzoate, lactate, benzenesulfonate, methanesulfonate, ethanesulfonate, etc.)

The more preferred compounds of this invention are also the more preferred compounds which are useful in treating gastrointestinal disorders and diseases and are described by the structural formula III:

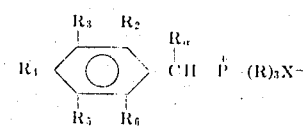

where:
$R_\alpha$ is hydrogen or loweralkyl;
$R_2$, $R_3$, $R_4$, $R_5$ and $R_6$ are
hydrogen, halo, cyano, haloloweralkyl, nitro, haloloweralkoxy, haloloweracyl, haloloweralkylsulfonyl or halodiloweralkylsulfonamido;
R is a five to 12 carbon atom member which may be straight chained or branched and is
alkyl, alkenyl, cycloalkenyl or cycloalkyl; and
X⁻ is chloride, bromide, iodide, nitrate, phosphate or sulfate.

The most preferred compounds of this invention embrace those compounds of structural formula III where:
$R_\alpha$ is hydrogen or methyl;
$R_2$, $R_3$, $R_4$, $R_5$ and $R_6$ are
hydrogen, fluoro, chloro, bromo, iodo, trifluoromethyl or nitro;
R is hexyl, heptyl, octyl, cyclohexyl, cycloheptyl or cyclooctyl; and
X⁻ is chloride, bromide or iodide.

In the descriptive portions of this invention, the following definitions apply: The term "lower alkyl" refers to a lower alkyl hydrocarbon group containing from one to about eight carbon atoms which may be straight chained or branched.

The term "lower alkenyl" refers to a lower alkenyl hydrocarbon group containing from one to about eight carbon atoms which may be straight chained or branched.

The "acyl" radical may be any organic radical derived from an organic acid by the removal of its hydroxyl group, such as acetyl, propionyl, benzoyl, etc.

The "lower alkoxy" radical signifies an alkoxy group containing from one to about eight carbon atoms which can be straight chained or branched.

The compounds of this invention can contain an asymetric carbon atom when $n = 1$ and $R_\alpha$ is not H. For this reason, they may be obtained as racemic mixtures or as dextro (+) and levorotatory (−) isomers. These may be separated by any of the various methods of resolution to obtain the $d$ or $l$ compound. It is understood that these optical isomers are embraced within the scope of this invention.

Representative compounds of this invention which are particularly useful are as follows:

trioctylbenzyl phosphonium chloride
trioctyl(o-chlorobenzyl)phosphonium chloride
trioctyl(m-chlorobenzyl)phosphonium chloride
trioctyl(p-chlorobenzyl)phosphonium chloride
trioctyl(p-trifluoromethylbenzyl)phosphonium chloride
trioctyl(p-trifluoromethoxybenzyl)phosphonium chloride
trioctyl(p-dimethylsulfamylbenzyl)phosphonium chloride
trioctyl(2,3-dichlorobenzyl)phosphonium chloride
trioctyl(2,5-dichlorobenzyl)phosphonium chloride
trioctyl(3,4-dichlorobenzyl)phosphonium chloride
trioctyl(3,5-dichlorobenzyl)phosphonium chloride
trioctyl(2,3,4-dichlorobenzyl)phosphonium chloride
trioctyl(2,3,5-dichlorobenzyl)phosphonium chloride
trioctyl(2,3,6-dichlorobenzyl)phosphonium chloride
trioctyl(2,4,5-dichlorobenzyl)phosphonium chloride
trioctyl(3,4,5-dichlorobenzyl)phosphonium chloride
trioctyl(2,6-dichlorophenethyl)phosphonium chloride
trioctyl(2,6-dibromobenzyl)phosphonium bromide
trioctyl(2,4,6-trichlorobenzyl)phosphonium chloride
trioctyl(2,4,6-tribromobenzyl)phosphonium bromide
trioctyl(2,6-dichlorobenzyl)phosphonium chloride
trioctyl(2,4-dichlorobenzyl)phosphonium chloride
trioctyl(2,4-dibromobenzyl)phosphonium bromide
trioctyl(2,6-dichloro-α-methylbenzyl)phosphonium chloride
trioctyl(3,5-ditrifluoromethylbenzyl)phosphonium chloride
trioctyl(3,4,5-trimethoxybenzyl)phosphonium chloride
trioctyl(2,4,6-trimethoxybenzyl)phosphonium chloride
trioctyl(3,5-dichloro-4-methoxybenzyl)phosphonium chloride
trioctyl(2,3,5,6-tetrafluorobenzyl)phosphonium chloride
trioctyl(2,3,4,5-tetrafluorobenzyl)phosphonium chloride
trioctyl(2,6-dibromo-4-trifluoromethylbenzyl)phosphonium bromide
trioctyl(2,4,6-tribromobenzyl)phosphonium bromide
trioctyl(2,6-dibromo-4-chlorobenzyl)phosphonium chloride
trioctyl(2,6-dichloro-4-bromobenzyl)phosphonium chloride
trioctyl(2,6-dichloro-4-trifluoromethylbenzyl)phosphonium chloride
trioctyl(2,4-dichloro-6-thiocyanatobenzyl)phosphonium chloride
trioctyl(2,6-dibromo-4-fluorobenzyl)phosphonium bromide
trioctyl(2,6-dichloro-4-thiocyanatobenzyl)phosphonium chloride
trioctyl(2,6-dichloro-4-fluorobenzyl)phosphonium chloride
trioctyl(2,6-dibromo-4-iodobenzyl)phosphonium iodide
trioctyl(2,6-dichloro-4-nitrobenzyl)phosphonium chloride
trioctyl(2,4-dichloro-6-nitrobenzyl)phosphonium chloride
trioctyl(2,6-dibromo-4-nitrobenzyl)phosphonium bromide
trioctyl(2,6-dichloro-4-cyanobenzyl)phosphonium chloride
trioctyl(2,6,4'-trichloro-4-dibenzyl)phosphonium chloride
trioctyl(2,6-dichloro-4-phenoxybenzyl)phosphonium chloride
trioctyl(2,6,4'-trichloro-4-phenoxybenzyl)phosphonium chloride
trioctyl(2,6-dibromo-4-(4'-chlorophenoxy)benzyl)phosphonium bromide
trioctyl(2,6-dibromo-4-phenoxybenzyl)phosphonium bromide
trioctyl(2,6-dibromo-4'-chloro-4-dibenzyl)phosphonium bromide
triheptyl(2,6-dichlorobenzyl)phosphonium chloride
triheptyl(2,6-dibromobenzyl)phosphonium bromide
triheptyl(2,4,6-trichlorobenzyl)phosphonium chloride
triheptyl(2,4,6-tribromobenzyl)phosphonium bromide
triheptyl(2,6-dibromo-4-trifluoromethylbenzyl)phosphonium bromide
triheptyl(2,6-dibromo-4-nitrobenzyl)phosphonium bromide
trinonyl(2,6-dichlorobenzyl)phosphonium chloride
trinonyl(2,6-dibromobenzyl)phosphonium bromide
trihexyl(2,6-dichlorobenzyl)phosphonium chloride
tricyclohexyl(2,6-dichlorobenzyl)phosphonium chloride
tricycloheptyl(2,6-dichlorobenzyl)phosphonium chloride tricyclooctyl(2,6-dichlorobenzyl)phosphonium chloride
trihexyl(2,4,6-trichlorobenzyl)phosphonium chloride
tridecyl(2,6-dichlorobenzyl)phosphonium chloride
triundecyl(2,6-dichlorobenzl)phosphonium chloride
tridodecyl(2,6-dichlorobenzyl)phosphonium chloride
trioctyl(2,6-dichlorobenzyl)phosphonium bromide
trioctyl(2,6-dichlorobenzyl)phosphonium iodide
trioctyl(2,6-dichlorobenzyl)phosphonium sulfate
trioctyl(2,6-dichlorobenzyl)phosphonium nitrate
trioctyl(2,6-dichlorobenzyl)phosphonium phosphate
trioctyl(2,6-dichlorobenzyl)phosphonium acetate
trioctyl(2,6-dichlorobenzyl)phosphonium benzoate The compounds of this invention may be prepared by the following general procedures.

Condensation of a trisubstituted phosphine and an aralkylhalide results in the corresponding aralkyl trisubstituted phosphonium halide.

The following reaction equation illustrates this synthesis:

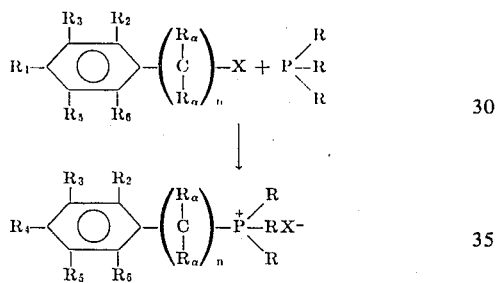

where $n$, $R$, $R_\alpha$, $R_2$, $R_3$, $R_4$, $R_5$ and $R_6$ are as described above and X is halogen.

The reaction is preferably carried out on the aralkyl bromide or chloride using a solvent and with increased temperatures.

The reaction is preferably carried out in an inert atmosphere preferably nitrogen or carbon dioxide. The solvent should be one that is miscible with the reactants and is convenient to use the reactant halide in excess as the solvent or alternatively a high boiling polar medium such as phenol, acetonitrile, dimethylformamide, dimethylsulfoxide, methylethylketone, isopropanol, 2-nitropropane, etc. The reaction temperature may vary from room temperature with readily reactive reactants to about 250°C, although it is preferable to run the reaction at temperatures from about 50°C to 150°C. The isolation of the desired phosphonium halide can be carried out by distilling off the solvent in vacuo and precipitating the phosphonium halide by the addition of a hydrocarbon liquid such as n-pentane, n-hexane, cyclohexane, etc. Other anions can be produced by exchange of the halide with alkali or alkaline earth salts containing the appropriate anion.

The starting materials employed in these foregoing methods are either known compounds or they may be prepared by the following reaction sequences.

The benzyl and phenethyl halide starting materials can be conveniently prepared by the following reactions:

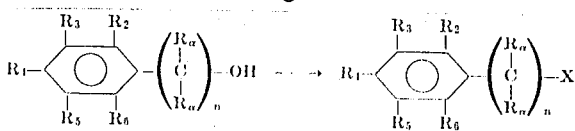

where $n$, $R_2$, $R_3$, $R_4$, $R_5$, $R_6$ and $R_\alpha$ are as described above.

The reaction is normally carried out by treating a benzene solution of a benzyl or phenethyl alcohol with phosphorous trihalide, phosphorous oxyhalide, phosphorous pentahalide, thiomylhalide or sulfuryl halide at reflux temperature for about 1 hour. This can also be performed in other inert solvents (such as toluene, chloroform, carbon tetrachloride, etc.) or by using excess halogenating agent as solvent. A temperature from about 50° to 150°C is satisfactory. The benzyl alcohols may be prepared by the following reaction sequence.

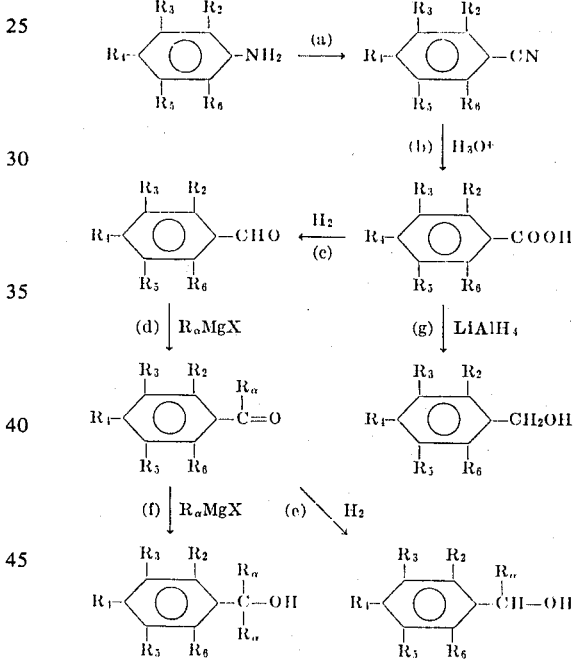

Diazotization of an aromatic amine in the conventional manner followed by a Sandmeyer (a) type displacement produces the nitrile, which is then hydrolyzed (b) to the carboxylic acid. Rosenmund reduction (c) of the carboxylic acid results in the aldehyde which in turn is interacted with the desired Grignard reagent and oxidized (d) to obtain the α-ketone. This may then either be reduced catalytically (e) to the α-substituted benzyl alcohol or a second Grignard reaction (f) may be carried out to obtain the α,α-disubstituted benzyl alcohol. Lithium aluminum hydride reduction of the benzoic acid (g) results in the benzyl alcohol.

The phenethylhalide starting materials may be prepared in an analogous manner starting with the substituted α-phenylalkanoic acid.

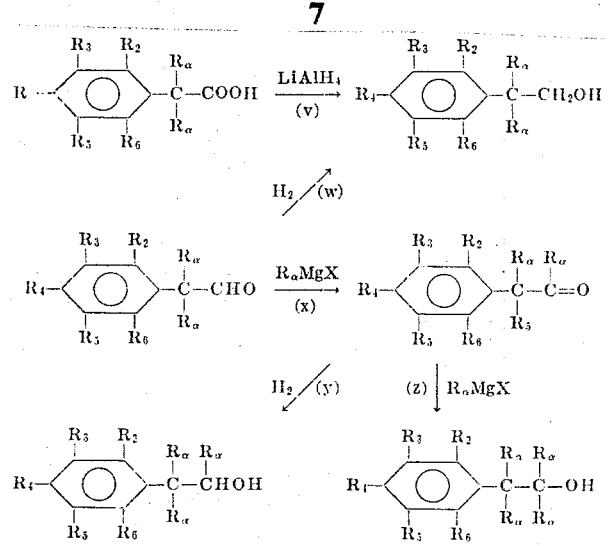

Lithium aluminumhydride reduction (v) of the proper phenylacetic acid results in the corresponding phenylethanol. This alcohol may also be prepared by catalytically reducing (w) the desired phenylacetaldehyde. A Grignard reaction (x) on the latter compound results in the α-substituted ketone which may then either be reduced catalytically (y) to the α-substituted phenethanol or a second Grignard reaction (z) may be carried out to obtain the α,α-disubstituted phenethanol.

Appropriately desired end products having various $R_2$, $R_3$, $R_4$, $R_5$ and $R_6$ substituents can be prepared at various stages of the synthesis of the starting materials by using suitable reactions in order to convert one group to another. Thus, for example, using conventional methods, a halogen group can be treated under Rosenmund Von Brown conditions to the nitrile compound which in turn can be hydrolyzed to a carboxy. A nitro can be reduced to an amino which can be alkylated to the dialkylamino substituent. A hydroxy compound can be prepared by demethylation of a methoxy substituent. A Sandmeyer type reaction can be carried out on an amino compound to introduce a chloro, bromo, xanthate, hydroxyl or alkoxyl group. The xanthate can then lead to the mercapto by hydrolysis, this in turn can be alkylated to an alkylthio group which can be oxidized to alkylsulfinyl and alkylsulfonyl groups. A thiocyanato group may be reduced to a mercapto. An iodo group may be removed by catalytic hydrogenation.

Tertiary phosphines having the same groups may be prepared from phosphorous halides with organometallic compounds by procedures known in the art.

$$PX_3 + RMgX$$

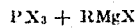

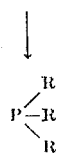

where R is as described above and X is halide.

For the preparation of tertiary phosphines with unlike groups, phospholhalo compounds may be reacted with an organometallic compound as above. These may be obtained by alkali cleavage of phosphonium salts according to conventional methods in the art. Thus, for example, with the correct choice of starting materials tertiary phosphines with three or, after quaternization, phosphonium salts with four different ligands can be prepared.

$$RPX_2 + R'MgX \rightarrow RPR'_2$$

We have found that the compounds of this invention have useful anti-ulcerogenic properties. Further, they have an effective degree of gastric anti-secretory activity, i.e., they reduce the volume and the acidity of the gastric fluid in humans and mammals. Still further, these compounds produce a considerable spasmolytic action on the gastrointestinal musculature, i.e., they reduce the peristaltic action of the gastrointestinal musculature which is manifested by a delay in gastric emptying time.

Until now, the known anti-ulcerogenic compounds which showed gastric anti-secretory and gastrointestinal spasmolytic action have included such agents as atropine, homatropine, propantheline, dicyclomine, etc. These compounds, however, cause accompanying undesirable anti-cholinergic properties such as mydriasis, xerostomia, cyclopegia, etc.

We have found that the phosphonium compounds of this invention are particularly useful as anti-secretory, anti-spasmodic and anti-ulcerogenic agents because they are essentially devoid of these unwanted effects.

In particular, the phosphonium compounds, as herein described, are useful in the treatment of such gastrointestinal disorders and diseases as duodenal ulcer and peptic ulcer.

For all these purposes, the phosphonium compounds of this invention can be administered orally or parenterally, but they are preferably administered orally. Orally, they may be administered as tablets, aqueous or oily suspension, dispersible powders or granules, emulsions, hard or soft capsules, or syrups or elixirs. The term parenteral, as used herein, includes subcutaneous injection, intramuscular injection or infusion techniques.

Compositions intended for oral use may be prepared according to any method known to the art for the manufacture of pharmaceutical compositions and such compositions may contain one or more agents selected from the group consisting of sweetening agents, flavoring agents, coloring agents and preserving agents, in order to provide a pharmaceutically elegant and palatable preparation.

Further, these compounds may be tableted or otherwise formulated so that for every 100 part by weight of the composition, there are present between 5 and 95 parts by weight of the active ingredient. The dosage unit form will generally contain between about 1 mg. and about 500 mg. of the active ingredients of this invention. The preferred unit dose is between about 10 mg. and 100 mg.

The dosage regimen in carrying out the methods of this invention is that which insures maximum therapeutic response until improvement is obtained and thereafter the minimum effective level which gives relief. Thus, in general, the dosages are those that are therapeutically effective in the treatment of ulcerogenic disease conditions or symptoms, such as duodenal and peptic ulcer. In general, the daily dose can be between about 0.1 mg/kg and 50 mg/kg (preferably in the range of 1–25 mg/kg/day). Bearing in mind, of course, that in selecting the appropriate dosage in any specific case, consideration must be given to the patient's weight, general health, age and other factors which may influence response to the drug.

Various tests in animals have been carried out to show the ability of the compounds of this invention to exhibit reactions that can be correlated with anti-ulcerogenic activity in humans. These tests involve such as the effect of the phosphonium compounds on gastric secretion, gastrointestinal spasm and their effect against ulcerogenic agents. It has been found that the compounds of this invention when tested in the above variety of situations show a marked activity.

One such test is the gastric secretion test. This test is carried out as follows. Shay rats are fasted for 4–8 hours, and water is given ad lib. The rats are selected at random and separated into groups of 10. The animals are treated intraduodenally (I.D.) with the test compound or the vehicle immediately subsequent to the ligation of the stomach at the pyloric sphincter. The animals are sacrificed with chloroform at 4 hours post-drug administration, the stomach is removed and its contents are assayed for volume, pH and total acids.

A second gastric secretion test is carried out on dogs. This is outlined in the Handbook of Physiology, Section 6: Alimentary Canal, Volume II: Secretion, American Physiology Society, Washington, D.C., 1967.

It has been found that the compounds of this invention when subjected to the above gastric secretion tests display a marked ability to decrease gastric volume and gastric acidity. These tests are known to correlate well with gastric activity in humans and is a standard test used to determine anti-secretory properties.

To determine the anti-ulcer effectiveness, the following test is employed: Male Wistar rats (130–150 grams) are fasted for 24 hours, then given reserpine at 5 mg/kg i.p. Twenty-four hours later, the stomachs are removed and examined for ulceration. Ulcers are graded on a 0–4 scale and the number of ulcers is recorded. Pretreatment with the phosphonium compounds of this invention produces a decrease in ulcer grade and the number of ulcers compared to the control reserpine-treated rats.

Determination of anti-spasmodic properties can be carried out by the procedure as outlined by D. A. Brodie and S. K. Kundrats in their article entitled "Effect of Drugs on Gastric Emptying in Rats", Fed. Proc. 24:714 (1965).

Mydriasis is detected by the procedure R. A. Turner, *Screening Methods in Pharmacology*, Academic Press, New York, and London, pp. 174–5, 1965. Acute toxicity is calculated according to the standard Litchfield-Wilcoxon procedure.

In view of the results of these tests, the pharmacological data clearly indicates that the phosphonium compounds of this invention can be considered to be effective anti-ulcerogenic, anti-secretory, and anti-spasmodic agents which are substantially free of anti-cholinergic side effects and having a low toxicity.

The following are detailed examples which show the preparation of the compounds of this invention. They are to be construed as illustrations of said compounds and not as limitations thereof.

Example 1

Tri-n-heptyl phosphine

To a Grignard mixture of n-heptylmagnesium chloride (0.43 mole) prepared from (10.9 g. of magnesium turnings and 57.5 g. of n-heptyl chloride) is added 13.2 g. (0.096 mole) of phosphorous trichloride in 100 ml of ether, in a nitrogen atmosphere, and 0°C. The reaction mixture is allowed to warm to room temperature with stirring over 2 hours. This is then poured onto an ice-cold saturated solution of ammonium chloride (250 ml) and the mixture stirred for 1 hour. The aqueous layer is extracted with 200 ml of ether, dried over sodium sulfate, evaporated to dryness and distilled to give tri-n-heptyl phosphine (b.p. 144°/0.1 mm).

When n-heptyl chloride in the above reaction is substituted with the halide of Table I below, then the corresponding product of Table II below is prepared.

Table I n-pentyl chloride
n-hexyl chloride
n-octyl chloride
n-nonyl chloride
n-decyl chloride
n-undecyl chloride
n-dodecyl chloride
isoamyl chloride
2-methyl-1-butenyl chloride
cyclohex-2-enyl chloride
cyclohex-3-enyl chloride
cycloheptyl chloride
cyclopentyl chloride
cyclohexyl chloride
cyclohexylmethyl chloride 3,5,5-trimethylheptyl chloride
2-propylallyl chloride
4-methyl-3-penten-1-yl chloride
2-methylheptyl chloride
3-methylheptyl chloride
2-ethylhexyl chloride
2,2,3,3-tetramethylbutyl chloride
cyclooctyl chloride
cyclooct-2-enyl chloride
bicyclo(3.2.1)oct-2-yl chloride
iso-octenyl chloride
spiro(3.4)oct-2-yl chloride Table II tri-n-pentyl phosphine
tri-n-hexyl phosphine
tri-n-octyl phosphine
tri-n-nonyl phosphine
tri-n-decyl phosphine
tri-n-undecyl phosphine
tri-n-dodecyl phosphine
tri-isoamyl phosphine
tris-(2-methyl-1-butenyl)phosphine
tris-(cyclohex-2-enyl)phosphine
tris-(cyclohex-3-enyl)phosphine
tricycloheptyl phosphine
tricyclopentyl phosphine
tricyclohexyl phosphine
tricyclohexylmethyl phosphine
tris-(3,5,5-trimethylheptyl)phosphine
tris-(2-propylallyl)phosphine
tris-(4-methyl-3-penten-1-yl)phosphine tris-(2-methylheptyl)phosphine
tris-(3-methylheptyl)phosphine
tris-(2-ethylhexyl)phosphine
tris-(2,2,3,3-tetramethylbutyl)phosphine
tricyclooctyl phosphine
tris-(cyclooct-2-enyl)phosphine
tris-(bicyclo[3.2.1]oct-2-yl)phosphine
tri-(iso-octenyl)phosphine
tri-(spiro[3.4]oct-2-yl)phosphine When phosphorous trichloride in the above example is replaced with dichloroheptylphosphine, dichlorocyclohexylphosphine and chlorodiheptylphosphine, then the starting materials prepared are dioctylheptylphosphine, dioctylcyclohexylphosphine and diheptyloctylphosphine.

Example 2

Trioctyl(p-chlorobenzyl)phosphonium chloride

To 25 g. (0.0675 mole) of tri-n-octyl phosphine dissolved in 150 ml of acetonitrile in a nitrogen atmosphere is added 11.9 g. (0.074 mole) of α,p-dichlorotoluene dissolved in 50 ml of acetonitrile. To the mixture is added 20 ml of benzene to cause solution. The mixture is then heated at reflux temperature for 25 hours, cooled to room temperature and evaporated in vacuo. The crude product is triturated with hexane, filtered, washed wth hexane, and dried to obtain trioctyl(p-chlorobenzyl) phosphonium chloride (m.p.75.5°–78°C).

Example 3

Trioctyl(2,6-dichlorobenzyl)phosphonium chloride

To 91 g. (0.245 mole) of tri-n-octyl phosphine in 500 ml of acetonitrile are added 52.8 g. (0.27 mole) of 2,6-dichlorobenzyl chloride. The mixture is then refluxed for 15 hours, concentrated in vacuo and the residue agitated with 3–200 ml of portions of hexane. The hexane is evaporated to give trioctyl(2,6-dichlorobenzyl)phosphonium chloride (m.p. 42°–44.5°C).

When tri-n-octyl phosphine in the above example is substituted for the phosphines of Example 1, then the corresponding product below is prepared.

tri-n-pentyl(2,6-dichlorobenzyl)phosphonium chloride
tri-n-hexyl(2,6-dichlorobenzyl)phosphonium chloride
tri-n-heptyl(2,6-dichlorobenzyl)phosphonium chloride
tri-n-nonyl(2,6-dichlorobenzyl)phosphonium chloride
tri-n-decyl(2,6-dichlorobenzyl)phosphonium chloride
tri-n-undecyl(2,6-dichlorobenzyl)phosphonium chloride
tri-n-dodecyl(2,6-dichlorobenzyl)phosphonium chloride
tri-isoamyl(2,6-dichlorobenzyl)phosphonium chloride
tris-(2-methyl-1-butenyl)(2,6-dichlorobenzyl)-phosphonium chloride
tris-(cyclohex-2-enyl)(2,6-dichlorobenzyl)phosphonium chloride
tris-(cyclohex-3-enyl)(2,6-dichlorobenzyl)phosphonium chloride
tricycloheptyl(2,6-dichlorobenzyl)phosphonium chloride
tricyclopentyl(2,6-dichlorobenzyl)phosphonium chloride
tricyclohexyl(2,6-dichlorobenzyl)phosphonium chloride
tricyclohexylmethyl(2,6-dichlorobenzyl)phosphonium chloride
tris-(3,5,5-trimethylheptyl)(2,6-dichlorobenzyl)-phosphonium chloride
tris-(2-propylallyl)(2,6-dichlorobenzyl)phosphonium chloride
tris-(4-methyl-3-penten-1-yl)(2,6-dichlorobenzyl)-phosphonium chloride tris-(2-methylheptyl)(2,6-dichlorobenzyl)phosphonium chloride
tris-(3-methylheptyl)(2,6-dichlorobenzyl)phosphonium chloride
tris-(2-ethylhexyl)(2,6-dichlorobenzyl)phosphonium chloride
tris-(2,2,3,3-tetramethylbutyl)(2,6-dichlorobenzyl)phosphonium chloride
tricyclooctyl(2,6-dichlorobenzyl)phosphonium chloride
tris-(cyclooct-2-enyl)(2,6-dichlorobenzyl)phosphonium chloride
tris-(bicyclo[3.2.1]oct-2-yl)(2,6-dichlorobenzyl)-phosphonium chloride
tri-(iso-octenyl)(2,6-dichlorobenzyl)phosphonium chloride
tri-(spiro[3.4]oct-2-yl)(2,6-dichlorobenzyl)phosphonium chloride
dioctylheptyl(2,6-dichlorobenzyl)phosphonium chloride diheptyloctyl(2,6-dichlorobenzyl)phosphonium chloride
dioctylcycloheptyl(2,6-dichlorobenzyl)phosphonium chloride Example 4

Trioctyl(2,6-dichlorobenzyl)phosphonium bromide 48 g. of trioctyl(2,6-dichlorobenzyl)phosphonium chloride is added to 200 ml of a saturated aqueous sodium bromide solution. The mixture is then heated to 90°, the solid is melted and the mixture is stirred for 5 min, cooled in an ice-bath and the water decanted. Another 200 ml of saturated sodium bromide solution is added and the procedure repeated. The ion exchanged phosphonium bromide is filtered, washed with 1 liter of water followed by 2-200 ml portions of hexane. The product is then heated twice with 300 ml of distilled water until a melt, cooled and the water decanted, triturated with hexane, and dried to obtain trioctyl(2,6-dichlorobenzyl)phosphonium bromide (m.p.86°–87.5°C).

When the sodium bromide solution of the above example is replaced with a solution of an appropriate salt of Table I below, then the corresponding desired phosphonium salt of Table II below is obtained.

Table I sodium iodide
sodium sulfate
sodium nitrate
sodium maleate
sodium citrate
sodium acetate
potassium oxalate
potassium bromide
sodium phosphate lithium bromide
sodium benzoate
sodium methanesulfonate Table II trioctyl(2,6-dichlorobenzyl)phosphonium iodide
trioctyl(2,6-dichlorobenzyl)phosphonium sulfate
trioctyl(2,6-dichlorobenzyl)phosphonium nitrate
trioctyl(2,6-dichlorobenzyl)phosphonium acetate
trioctyl(2,6-dichlorobenzyl)phosphonium oxalate
trioctyl(2,6-dichlorobenzyl)phosphonium bromide
trioctyl(2,6-dichlorobenzyl)phosphonium phosphate
trioctyl(2,6-dichlorobenzyl)phosphonium bromide
trioctyl(2,6-dichlorobenzyl)phosphonium benzoate
trioctyl(2,6-dichlorobenzyl)phosphonium methanesulfonate Example 5

Trioctyl(p-trifluoromethylbenzyl)phosphonium chloride

To 14.8 g. (0.04 mole) of tri-n-octyl phosphine suspended in 100 ml of acetonitrile is added 9.7 g. (0.05 mole) of p-trifluoromethylbenzyl chloride in 75 ml of acetonitrile. The reaction mixture is then heated at reflux for 24 hours, cooled and evaporated to dryness in vacuo. The residue is dissolved in hexane:ether, treated with charcoal, filtered and concentrated to dryness in vacuo to obtain trioctyl(p-trifluoromethylbenzyl)phosphonium chloride.

When the starting materials of Table I below are used in place of p-trifluoromethylbenzyl chloride in the above example, then the corresponding product of Table II below is obtained.

Table I benzyl bromide
benzyl chloride
benzyl iodide
P-trifluoromethoxybenzyl chloride
p-trifluoroacetylbenzyl chloride
o-trifluoromethylbenzyl chloride
p-trifluoromethylsulfonylbenzyl chloride
3,5-dimethylbenzyl bromide
o-chlorobenzyl chloride
m-chlorobenzyl chloride
p-chlorobenzyl chloride
p-ditrifluoromethylsulfamylbenzyl chloride
p-dimethylsulfamylbenzyl chloride
p-bromobenzyl bromide
2,6-dichloro-4-thiocyanatobenzyl chloride
2,4-dichlorobenzyl chloride
2,3-dichlorobenzyl chloride
3,4-dichlorobenzyl chloride
3,5-dichlorobenzyl chloride
2,5-dichlorobenzyl chloride
m-nitrobenzyl chloride
p-nitrobenzyl chloride
p-dimethylaminobenzyl chloride
o-methylbenzyl chloride
m-methylbenzyl chloride
p-methylbenzyl chloride
p-cyanobenzyl chloride
p-methoxybenzyl chloride
p-hydroxybenzyl chloride
p-carbethoxybenzyl chloride
o-methoxybenzyl chloride
p-acetoxybenzyl chloride
p-phenoxybenzyl chloride
p-(4-chlorophenoxy)benzyl chloride
p-methylthiobenzyl chloride
p-dimethylsulfonamidobenzyl chloride
α-cyclopropylmethylbenzyl chloride
α-ethylbenzyl chloride
α-allylbenzyl chloride
benzhydryl chloride
α-benzylphenethyl chloride
2,6-dibromobenzyl bromide           -yl)(p-trifluoromethylbenzyl)phosphonium
2,6-difluorobenzyl bromide
3,4,5-trimethoxybenzyl chloride
2,4,6-trimethoxybenzyl chloride
3,5-dichlorobenzyl chloride
2,4,6-trichlorobenzyl chloride
2,3,4-trichlorobenzyl chloride
3,4,5-trichlorobenzyl chloride
2,4,5-trichlorobenzyl chloride
2,3,5-trichlorobenzyl chloride
2,3,6-trichlorobenzyl chloride
2,4-dibromobenzyl bromide
2,4-difluorobenzyl bromide
2,4-dibromobenzyl bromide
2-bromo-4-nitrobenzyl bromide
2,3,4-trimethylbenzyl chloride
2,4,6-tribromobenzyl bromide
3,5-dibromobenzyl bromide
3,5-difluorobenzyl bromide
p-(4-chlorophenyl)benzyl chloride
2,6-dichloro-4-trifluoromethylbenzyl chloride
2,5-dinitrobenzyl chloride
2,6-dichloro-4-cyanobenzyl chloride
2,6-dichloro-4-thiocyanatobenzyl chloride
2,6-dichloro-4-fluorobenzyl chloride
p-acetamidobenzyl chloride
2-methoxy-4-chlorobenzyl chloride
2,3,4,5,6-pentafluorobenzyl chloride
2,3,5,6-tetrafluorobenzyl chloride
p-phenylbenzyl chloride
2,4-dichloro-6-thiocyanatobenzyl chloride
2,4-dichloro-6-nitrobenzyl chloride
2-nitro-4-trifluoromethylbenzyl chloride
2,6-dichloro-4-bromobenzyl bromide
3,5-ditrifluoromethylbenzyl chloride
3,5-dichloro-4-methoxybenzyl chloride
2-chloro-4-trifluoromethylbenzyl chloride
2,6-dibromo-4-chlorobenzyl bromide
2-chloro-4-bromobenzyl chloride
2,6-dibromo-4-nitrobenzyl bromide
2,6-dichloro-4-nitrobenzyl chloride
2,6-dibromo-4-iodobenzyl iodide
2,6-dibromo-4-trifluoromethylbenzyl bromide
2,6-dibromo-4-fluorobenzyl bromide
2,6-dichloro-α-methylbenzyl chloride
2,6-dichloro-α,α-dimethylbenzyl chloride
2,6-dichloro-α-phenylbenzyl chloride
2,6-dichloro-α-cyclohexylbenzyl chloride
phenethyl chloride
p-chlorophenethyl chloride
α-(cyclohex-2-enyl)benzyl chloride
α-tolylbenzyl chloride
α-xylylbenzyl chloride
α-benzylbenzyl chloride
2,6-dichlorophenethyl chloride p-chloro-α-methylphenethyl chloride
α,β-di-methylphenethyl chloride
β-phenylphenethyl chloride
2,6,4'-trichloro-4-dibenzyl chloride
2,6-dichloro-4-phenoxybenzyl chloride
2,6,4'-trichloro-4-phenoxybenzyl chloride
2,6-dibromo-4-(4'-chlorphenoxy)benzyl bromide
2,6-dibromo-4-phenoxybenzyl bromide
2,6-dibromo-40'-chloro-4-dibenzyl bromide Table II trioctylbenzyl phosphonium bromide
trioctylbenzyl phosphonium chloride
trioctylbenzyl phosphonium iodide
trioctyl(p-trifluoromethoxybenzyl)phosphonium chloride
trioctyl(p-trifluoroacetylbenzyl)phosphonium chloride
trioctyl(o-trifluoromethylbenzyl)phosphonium chloride
trioctyl(p-trifluoromethylsulfonylbenzyl)phosphonium chloride
trioctyl(p-dimenty(sulfamylbenzyl)phosphonium chloride
trioctyl(3,5-dimethylbenzyl)phosphonium bromide
trioctyl(o-chlorobenzyl)phosphonium chloride
trioctyl(m-chlorobenzyl)phosphonium chloride
trioctyl(p-chlorobenzyl)phosphonium chloride
trioctyl(p-di-trifluoromethylsulfamylbenzyl)phosphonium chloride
trioctyl(p-bromobenzyl)phosphonium bromide
trioctyl(2,6-dichloro-4-thiocyanatobenzyl)phosphonium chloride
trioctyl(2,4-dichlorobenzyl)phosphonium chloride
trioctyl(2,3-dichlorobenzyl)phosphonium chloride
trioctyl(3,4-dichlorobenzyl)phosphonium chloride
trioctyl(3,5-dichlorobenzyl)phosphonium chloride
trioctyl(2,5-dichlorobenzyl)phosphonium chloride
trioctyl(m-nitrobenzyl)phosphonium chloride
trioctyl(p-nitrobenzyl)phosphonium chloride
trioctyl(p-dimethylaminobenzyl)phosphonium chloride
trioctyl(o-methylbenzyl)phosphonium chloride
trioctyl(m-methylbenzyl)phosphonium chloride
trioctyl(p-methylbenzyl)phosphonium chloride
trioctyl(p-cyanobenzyl)phosphonium chloride
trioctyl(p-methoxybenzyl)phosphonium chloride
trioctyl(p-hydroxybenzyl)phosphonium chloride
trioctyl(p-carbethoxybenzyl)phosphonium chloride
trioctyl(o-methoxybenzyl)phosphonium chloride
trioctyl(p-acetoxybenzyl)phosphonium chloride
trioctyl(p-phenoxybenzyl)phosphonium chloride
trioctyl[p-(4-chlorophenoxy)benzyl]phosphonium chloride   trioctyl(p-methylthiobenzyl)phosphonium chloride
trioctyl(p-dimethylsulfonamidobenzyl)phosphonium chloride
trioctyl(α-cyclopropylmethylbenzyl)phosphonium chloride
trioctyl(α-ethylbenzyl)phosphonium chloride
trioctyl(α-allylbenzyl)phosphonium chloride
trioctyl(benzhydryl)phosphonium chloride
trioctyl(α-benzylphenethyl)phosphonium chloride
trioctyl(2,6-dibromobenzyl)phosphonium bromide
trioctyl(2,6-difluorobenzyl)phosphonium bromide
trioctyl(2,4-dibromobenzyl)phosphonium bromide
trioctyl(3,4,5-trimethoxybenzyl)phosphonium chloride
trioctyl(2,4,6-trimethoxybenzyl)phosphonium chloride
trioctyl(3,5-dichlorobenzyl)phosphonium chloride
trioctyl(2,4,6-trichlorobenzyl)phosphonium chloride
trioctyl(2,3,4-trichlorobenzyl)phosphonium chloride
trioctyl(3,4,5-trichlorobenzyl)phosphonium chloride
trioctyl(2,4,5-trichlorobenzyl)phosphonium chloride
trioctyl(2,3,5-trichlorobenzyl)phosphonium chloride
trioctyl(2,3,6-trichlorobenzyl)phosphonium chloride
trioctyl(2,4-dibromobenzyl)phosphonium bromide
trioctyl(2,4-difluorobenzyl)phosphonium bromide
trioctyl(2-bromo-4-nitrobenzyl)phosphonium bromide
trioctyl(2,3,4-trimethylbenzyl)phosphonium chloride
trioctyl(2,4,6-tribromobenzyl)phosphonium bromide
trioctyl(3,5-dibromobenzyl)phosphonium bromide
trioctyl(3,5-difluorobenzyl)phosphonium bromide
trioctyl[p-(4-chlorophenyl)benzyl]phosphonium chloride
trioctyl(2,6-dichloro-4-trifluoromethylbenzyl)phosphonium chloride
trioctyl(2,5-dinitrobenzyl)phosphonium chloride
trioctyl(2,6-dichloro-4-cyanobenzyl)phosphonium chloride
trioctyl(2,6-dichloro-4-thiocyanatobenzyl)phosphonium chloride
trioctyl(2,6-dichloro-4-fluorobenzyl)phosphonium chloride
trioctyl(p-acetamidobenzyl)phosphonium chloride
trioctyl(2-methoxy-4-chlorobenzyl)phosphonium chloride
trioctyl(2,3,4,5,6-pentafluorobenzyl)phosphonium chloride
trioctyl(2,3,5,6-tetrafluorobenzyl)phosphonium chloride
trioctyl(p-phenylbenzyl)phosphonium chloride
trioctyl(2,4-dichloro-6-thiocyanatobenzyl)phosphonium chloride
trioctyl(2,4-dichloro-6-nitrobenzyl)phosphonium chloride
trioctyl(2-nitro-4-trifluoromethylbenzyl)phosphonium chloride
trioctyl(2,6-dichloro-4-bromobenzyl)phosphonium bromide
trioctyl(3,5-ditrifluoromethylbenzyl)phosphonium chloride
trioctyl(3,5-dichloro-4-methoxybenzyl)phosphonium chloride
trioctyl(2-chloro-4-trifluoromethylbenzyl)phosphonium chloride
trioctyl(2,6-dibromo-4-chlorobenzyl)phosphonium bromide
trioctyl(2-chloro-4-bromobenzyl)phosphonium chloride
trioctyl(2,6-nitrobenzyl)phosphonium 4nitrobenzyl)bromide trioctyl(2,6-dichloro-4-nitrobenzyl)phosphonium chloride
trioctyl(2,6-dibromo-4-iodobenzyl)phosphonium iodide
trioctyl(2,6-dibromo-4-trifluoromethylbenzyl)phosphonium bromide
trioctyl(2,6-dibromo-4-fluorobenzyl)phosphonium bromide
trioctyl(2,6-dichloro-α-methylbenzyl)phosphonium chloride
trioctyl(2,6-dichloro-α,α-dimethylbenzyl)phosphonium chloride
trioctyl(2,6-dichloro-α-phenylbenzyl)phosphonium chloride
trioctyl(2,6-dichloro-α-cyclohexylbenzyl)phosphonium chloride
trioctyl(phenethyl)phosphonium chloride
trioctyl(p-chlorophenethyl)phosphonium chloride
trioctyl[α-(cyclohex-2-enyl)benzyl]phosphonium chloride
trioctyl(α-tolylbenzyl)phosphonium chloride
trioctyl(α-xylylbenzyl)phosphonium chloride
trioctyl(α-benzylbenzyl)phosphonium chloride
trioctyl(2,6-dichlorophenethyl)phosphonium chloride
trioctyl(p-chloro-α-methylphenethyl)phosphonium chloride
trioctyl(α,β-di-methylphenethyl)phosphonium chloride
trioctyl(β-phenylphenethyl)phosphonium chloride
trioctyl(2,6,4'-trichloro-4-dibenzyl)phosphonium chloride
trioctyl(2,6-dichloro-4-phenoxybenzyl)phosphonium chloride
trioctyl(2,6,4'-trichloro-4-phenoxybenzyl)phosphonium chloride
trioctyl[2,6-dibromo-4-(4'-chlorophenoxy)benzyl]phosphonium bromide
trioctyl(2,6-dibromo-4-phenoxybenzyl)phosphonium bromide
trioctyl(2,6-dibromo-4'-chloro-4-dibenzyl)phosphonium chloride Example 6

When the procedures of Examples 1–5 are followed but the starting materials are selected from Table I, Example 3 and Table I, Example 5, then the following representative compounds are prepared.

tri-n-heptyl(p-trifluoromethylbenzyl)phosphonium chloride
tri-n-hexyl(2,4-dichlorobenzyl)phosphonium chloride
tricyclohexyl(p-chlorobenzyl)phosphonium chloride
tricyclooctyl(p-nitrobenzyl)phosphonium chloride
tricyclohexyl(p-dimethylaminobenzyl)phosphonium chloride
tri-n-nonyl(p-cyanobenzyl)phosphonium chloride
tris-(2-ethylhexyl)(3,4,5-trichlorobenzyl)phosphonium chloride
tris-(3-methylheptyl)(2,6-dibromobenzyl)phosphonium bromide
tricyclopentyl(2,6-dichloro-α-methylbenzyl)phosphonium chloride
tri-n-heptyl(2,3-dichlorobenzyl)phosphonium chloride
tri-n-heptyl(2,4-dichlorobenzyl)phosphonium chloride
tri-n-heptyl(2,5-dichlorobenzyl)phosphonium chloride
tri-n-heptyl(3,4-dichlorobenzyl)phosphonium chloride
tri-n-heptyl(2,3,4,5,6-pentafluorobenzyl)phosphonium chloride
tricyclohexyl(p-nitrobenzyl)phosphonium chloride
tris-(3,5,5-trimethylheptyl)benzyl phosphonium chloride
tri-n-dodecylphenethyl phosphonium chloride
tri-n-heptyl[p-(4-chlorophenyl)benzyl]phosphonium chloride
tri-(iso-octenyl)(β-phenylphenethyl)phosphonium chloride
tri-n-pentyl(2,3,5-trichlorobenzyl)phosphonium chloride
tridodecyl(p-chlorobenzyl)phosphonium chloride
tris-(2,2,3,3-tetramethylbutyl)benzyl phosphonium chloride
tri-n-heptyl[p-(4-chlorophenoxy)benzyl]phosphonium chloride
tri-n-heptyl(2,6-dibromobenzyl)phosphonium bromide
tri-n-hexyl(2,6-dibromobenzyl)phosphonium bromide
tris-(2-methylheptyl)(2,6-dibromobenzyl)phosphonium bromide
tris-(2-methylheptyl)(p-trifluoromethylbenzyl)phosphonium chloride
tris-(cyclooct-2-enyl)(p-trifluoromethylbenzyl)phosphonium chloride
tri-isoamyl(p-trifluoromethylbenzyl)phosphonium chloride
tris-(2-methyl-1-butenyl)(p-trifluoromethylbenzyl) phosphonium chloride
tri-n-hexyl(p-trifluoromethylbenzyl)phosphonium chloride
tris-(spiro[3.4]oct-2-yy)(p-trifluoromethylbenzyl)phosphonium chloride
tri-n-heptyl(p-phenoxybenzyl)phosphonium chloride
tri-n-undecyl(2,6-dibromobenzyl)phosphonium bromide
tris-(bicyclo[3.2.1]oct-2-yl)(p-trifluoromethylbenzyl) phosphonium chloride
tri-n-heptyl(3,4,5-trimethoxybenzyl)phosphonium chloride
tris-(2-propylallyl)(p-chlorobenzyl)phosphonium chloride
triheptyl(2,4,6-tribromobenzyl)phosphonium bromide
triheptyl(2,6-dibromo-4-trifluoromethylbenzyl)phosphonium bromide
trihepyl(2,6-dibromo-4-nitrobenzyl)phosphonium bromide
trinonyl(2,6-dibromobenzyl)phosphonium bromide
trihexyl(2,4,6-trichlorobenzyl)phosphonium chloride
tricyclohexyl(2,6-dibromobenzyl)phosphonium bromide
tricyclohexy(p-chlorobenzyl)phosphonium chloride

We claim:
1. A compound of the formula

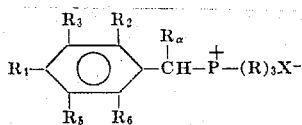

where:
R$_\alpha$ is hydrogen or methyl;
R$_2$, R$_3$, R$_4$, R$_5$ and R$_6$ are
  hydrogen, fluoro, chloro, bromo, iodo, trifluoromethyl or nitro;
R is hexyl, heptyl, octyl, cyclohexyl, cycloheptyl, cyclooctyl; and
X$^-$ is chloride, bromide or iodide.

2. A compound according to claim 1
where: p1 R$_\alpha$ is hydrogen;
R$_2$, R$_3$, R$_4$, R$_5$ and R$_6$ are
  hydrogen or chloro;
R is octyl; and
X$^-$ is chloride.

3. A compound according to claim 1
where:
R$_\alpha$ is hydrogen; and
R$_2$ and R$_6$ are chloro.

4. A compound according to claim 1
where:
R$_\alpha$ is hydrogen; and
R$_2$ and R$_6$ are bromo and R$_4$ is hydrogen, bromo, trifluoromethyl, nitro, or iodo.

5. A compound according to claim 2
where:
R$_2$ and R$_3$ are chloro, thus forming trioctyl(2,3-dichlorobenzyl)phosphonium chloride.

6. A compound according to claim 2
where:
R$_2$ and R$_4$ are chloro, thus forming trioctyl(2,4-dichlorobenzyl)phosphonium chloride.

7. A compound according to claim 2
where:
R$_2$ and R$_5$ are chloro, thus forming trioctyl(2,5-dichlorobenzyl)phosphonium chloride.

8. A compound according to claim 2
where:
R$_2$ and R$_6$ are chloro, thus forming trioctyl(2,6-dichlorobenzyl)phosphonium chloride.

9. A compound according to claim 2
where:
R$_3$ and R$_4$ are chloro, thus forming trioctyl(3,4-dichlorobenzyl)phosphonium chloride.

10. A compound according to claim 2
where:
R$_3$ and R$_5$ are chloro, thus forming trioctyl(3,5-dichlorobenzyl)phosphonium chloride.

11. A compound according to claim 2
where:
R$_2$, R$_3$ and R$_4$ are chloro, thus forming trioctyl(2,3,4-trichlorobenzyl)phosphonium chloride.

12. A compound according to claim 2
where:
R$_2$, R$_3$ and R$_5$ are chloro, thus forming trioctyl(2,3,5-trichlorobenzyl)phosphonium chloride.

13. A compound according to claim 2
where:
R$_2$, R$_3$ and R$_6$ are chloro, thus forming trioctyl(2,3,6-trichlorobenzyl)phosphonium chloride.

14. A compound according to claim 2
where:
R$_2$, R$_4$ and R$_5$ are chloro, thus forming trioctyl(2,4,5-trichlorobenzyl)phosphonium chloride.

15. A compound according to claim 2
where:
R$_2$, R$_4$ and R$_6$ are chloro, thus forming trioctyl(2,4,6-trichlorobenzyl)phosphonium chloride.

16. A compound according to claim 2
where:
R$_3$, R$_4$ and R$_5$ are chloro, thus forming trioctyl(3,4,5-trichlorobenzyl)phosphonium chloride.

17. A compound according to claim 1
where:
R$_2$, R$_3$, R$_5$ and R$_6$ are fluoro, R$_\alpha$ is hydrogen, R is octyl and X$^-$ is chloride, thus forming trioctyl(2,3,5,6-tetrafluorobenzyl)phosphonium chloride.

18. A compound according to claim 1
where:
R$_2$, R$_3$, R$_4$, R$_5$ and R$_6$ are fluoro, R$_\alpha$ is hydrogen, R is octyl and X$^-$ is chloride, thus forming trioctyl(2,3,4,5,6-pentafluorobenzyl)phosphonium chloride.

19. A compound according to claim 1
where:
R$_2$ and R$_6$ are chloro, R$_\alpha$ is methyl, R is octyl and X$^-$ is chloride, thus forming trioctyl(2,6-dichloro-$\alpha$-methylbenzyl)phosphonium chloride.

20. A compound according to claim 3
where:
R is hexyl and X$^-$ is chloride, thus fomring trihexyl(2,6-dichlorobenzyl)phosphonium chloride.

21. A compound according to claim 3
where:
R is heptyl and X$^-$ is chloride, thus forming triheptyl(2,6-dichlorobenzyl)phosphonium chloride.

22. A compound according to claim 3
where:
R is cyclohexyl and X$^-$ is chloride thus foming tricyclohexyl(2,6-dichlorobenzyl)phosphonium chloride.

23. A compound according to claim 3
where:
R is cycloheptyl and X$^-$ is chloride, thus forming tricycloheptyl(2,6-dichlorobenzyl phosphonium chloride.

24. A compound according to claim 3
where:
R is cyclooctyl and X$^-$ is chloride, thus forming tricyclooctyl(2,6-dichlorobenzyl)phosphonium chloride.

25. A compound according to claim 3
where:
R is octyl and X$^-$ is bromide, thus forming trioctyl(2,6-dichlorobenzyl)phosphonium bromide.

26. A compound according to claim 3
where:
R is octyl and X$^-$ is iodide thus forming trioctyl(2,6-dichlorobenzyl)phosphonium iodide.

27. A compound according to claim 4
where:
R$_4$ is hydrogen, R is octyl and X$^-$ is bromide, thus forming trioctyl(2,6-dibromobenzyl)phosphonium bromide.

28. A compound according to claim 4
where:
R$_4$ is bromo, R is octyl and X$^-$ is bromide thus forming trioctyl(2,4,6-tribromobenzyl) phosphonium bromide.

29. A compound according to claim 4 where:

R$_4$ is trifluoromethyl, R is octyl and X$^-$ is bromide, thus forming trioctyl(2,6-dibromo-4-trifluoromethylbenzyl)phosphonium bromide.

30. A compound according to claim 1 where:

R$_2$ and R$_6$ are chloro, R$_4$ is trifluoromethyl, R$_\alpha$ is hydrogen, R is octyl and X$^-$ is chloride, thus forming trioctyl(2,6-dichloro-4-trifluoromethylbenzyl)phosphonium chloride.

31. A compound according to claim 4 where:

R$_4$ is nitro, R is octyl and X$^-$ is bromide, thus forming trioctyl(2,6-dibromo-4-nitrobenzyl) phosphonium bromide.

32. A compound according to claim 4 where:

R$_4$ is iodo, R is octyl and X$^-$ is iodide, thus forming trioctyl(2,6-dibromo-4-iodobenzyl) phosphonium iodide.

33. A compound according to claim 1 where:

R$_4$ is trifluoromethyl, R$_\alpha$ is hydrogen, R is octyl and X$^-$ is chloride, thus forming trioctyl(p-trifluoromethylbenzyl)phosphonium chloride.

* * * * *